(12) United States Patent
Foley (10) Patent No.: US 10,046,712 B1
(45) Date of Patent: Aug. 14, 2018

(54) VEHICLE BICYCLE RACK (71) Applicant: John Foley, Springhill, FL (US)

(72) Inventor: John Foley, Springhill, FL (US)

( * ) Notice: Subject to any disclaimer, the term of this patent is extended or adjusted under 35 U.S.C. 154(b) by 149 days.

(21) Appl. No.: 15/234,546

(22) Filed: Aug. 11, 2016

Related U.S. Application Data (60) Provisional application No. 62/218,866, filed on Sep. 15, 2015.

(51) Int. Cl.
B62H 3/00 (2006.01)
B60R 9/10 (2006.01)
B60R 9/06 (2006.01)

(52) U.S. Cl.
CPC . B60R 9/10 (2013.01); B60R 9/06 (2013.01)

(58) Field of Classification Search
CPC .................................... B60R 9/10; B62H 3/00
USPC .................................................. 224/282, 924
See application file for complete search history.

(56) References Cited

U.S. PATENT DOCUMENTS

| 4,400,129 A | 8/1983 | Eisenberg et al. | |
|---|---|---|---|
| 4,856,686 A * | 8/1989 | Workentine | B60R 9/06 224/497 |
| 5,067,641 A | 11/1991 | Johnson et al. | |
| 5,190,195 A * | 3/1993 | Fullhart | B60R 9/10 224/497 |
| 5,330,084 A | 7/1994 | Peters | |
| 5,427,286 A | 6/1995 | Hagerty | |
| 5,645,202 A * | 7/1997 | Kaloustian | B60R 9/06 224/314 |
| 5,690,260 A * | 11/1997 | Aikins | B60R 9/06 224/504 |
| 6,237,824 B1 | 5/2001 | Bagley | |
| 6,575,344 B2 | 6/2003 | Nusbaum | |
| 6,644,525 B1 * | 11/2003 | Allen | B60R 9/06 224/282 |
| 7,055,725 B1 * | 6/2006 | Kolda | B60R 9/06 224/497 |
| 7,419,076 B1 * | 9/2008 | Grothues | B60R 9/08 114/343 |
| 7,565,990 B2 | 7/2009 | Bryan, IV | |
| 7,766,202 B2 * | 8/2010 | Depot | B60R 9/06 224/504 |
| 8,066,162 B2 * | 11/2011 | Chiang | B60R 9/06 224/321 |
| 8,444,032 B2 * | 5/2013 | Pedrini | B60R 9/06 224/314 |
| 8,490,847 B2 * | 7/2013 | Sautter | B60R 9/06 224/497 |
| 8,556,144 B2 * | 10/2013 | Liu | B60R 9/08 224/497 |

(Continued)

Primary Examiner — Brian D Nash
(74) Attorney, Agent, or Firm — H. John Rizvi; Gold & Rizvi, P.A.

(57) ABSTRACT

A vehicle bicycle rack is provided including a telescopic, height-adjustable support, attachable to a vehicle, and an arm assembly carried by the support for holding one or more bicycles. The arm assembly is pivotably mounted to the support and is height-adjustable by adjusting the height of the support. The arm assembly can adopt various rotational positions, including a stowed position in which the arm assembly is pivoted downward, and a deployed position in which the arm assembly is pivoted rearward and one or more bicycles can be carried by the arm assembly.

15 Claims, 9 Drawing Sheets (56) References Cited

U.S. PATENT DOCUMENTS

| | | | |
|---|---|---|---|
| 8,573,456 B2 * | 11/2013 | Farber | B60R 9/10 |
| | | | 224/314 |
| 8,783,536 B1 | 7/2014 | Julian | |
| 2012/0000952 A1 * | 1/2012 | Dreger | B60R 9/10 |
| | | | 224/533 |
| 2015/0083769 A1 * | 3/2015 | Williams | B60R 9/10 |
| | | | 224/488 |

* cited by examiner

VEHICLE BICYCLE RACK

CROSS-REFERENCE TO RELATED APPLICATION

This application claims the benefit of U.S. Provisional Patent Application Ser. No. 62/218,866, filed Sep. 15, 2015, which is incorporated herein in its entirety.

FIELD OF THE INVENTION

The present invention relates generally to vehicle bicycle racks of the kind that are mounted on vehicles to carry one or more bicycles or other similar apparatus, and more particularly, to a foldable and height-adjustable vehicle bicycle rack.

BACKGROUND OF THE INVENTION

Vehicle bicycle racks, consisting in a structure which is mounted on an automobile vehicle for carrying one or more bicycles, are widely used to facilitate the transportation of bicycles and similar apparatus. Typically, vehicle bicycle racks are mounted outside of the vehicle, such as by having the rack couple to a trailer hitch receiver installed on the vehicle. Having the rack disposed outside the vehicle allows rapid and easy access to the rack for loading and unloading a bicycle onto and from the rack. Also, because the racks are mounted outside of the vehicle, the racks allow riders to conveniently transport one or more bicycles over relatively long distances, regardless of the size of the vehicle and without a need to disassemble the bicycle. Bicycle racks thus can allow a rider to use his or her bicycle at locations that otherwise would not be accessible to the rider without undue inconvenience.

While most vehicle bicycle racks facilitate relatively quick and easy mounting and dismounting of the bicycle, installing and removing the rack itself can take considerable time and effort, particularly when the vehicle bicycle rack is of the rigid type, normally made of aluminum or other lightweight metal. Thus, users often leave this type of rack on their vehicle when the rack is not in use. In their mounted position on the vehicle, most, if not all vehicle bicycle racks, however, protrude from the vehicle and thereby increase the overall dimensional footprint of the vehicle. This can result in disadvantages, such as making it difficult or impossible to park the vehicle in a confined area that, were it not for the presence of the rack, would readily accommodate the vehicle.

Also, most vehicle bicycle racks do not allow the height of the bicycle above the ground to be varied so as to maintain a required or otherwise desired clearance between the bicycle and the ground. This can be disadvantageous because bicycles are made in a wide range of sizes. Therefore, a rack sized for a particular type of bicycle may hold other types of bicycles at a height that is too low, resulting in ground-clearance issues; or too high, leading to visibility restrictions through the vehicle's rear window.

Thus, there retrains a need in the art for a vehicle mounting rack which solves at least one of the aforementioned problems.

SUMMARY OF THE INVENTION

The present invention is directed to a vehicle bicycle rack including a telescopic, height-adjustable support, attachable to a vehicle, and an arm assembly carried by the support for holding one or more bicycles. The arm assembly is pivotably mounted to the support and is height-adjustable by adjusting the height of the support. The arm assembly can adopt various rotational positions, including a stowed position in which the arm assembly is pivoted downward, and a deployed position in which the arm assembly is pivoted rearward and one or more bicycles can be carried by the arm assembly. The height-adjustable and pivotable vehicle bicycle rack can adopt a compact configuration when not in use and can be height-adjusted not to interfere with the vehicle hatch. The vehicle bicycle rack can quickly and easily be converted to the deployed position to adjust to differently sized bicycles.

In a first implementation of the invention, a vehicle bicycle rack for attaching to a vehicle and carrying at least one bicycle thereon includes a support, attachable to the vehicle, and an arm assembly. The arm assembly includes a first portion pivotably mounted on the support, and a second portion extending from the first portion and configured to hold the at least one bicycle. The support is height adjustable for varying the height of the arm assembly relative to the vehicle. The arm assembly can pivotably adopt a stowed position in which the arm assembly is pivoted downward, and a deployed position in which the arm assembly is pivoted rearward.

In another implementation of the invention, a vehicle bicycle rack for attaching to a vehicle and carrying at least one bicycle thereon includes a support, attachable to the vehicle, and an arm assembly. The support comprises a sleeve arranged in a left-to-right, transverse direction. The arm assembly, in turn, includes a cross member pivotably mounted on the support by rotatably extending through the sleeve of the support. The arm assembly further includes at least one arm carried by and extending from the cross member and configured to hold the at least one bicycle. The support is telescopically height-adjustable for varying the height of the sleeve and cross member relative to the vehicle. The arm assembly can pivotably adopt a stowed position in which the arm assembly is pivoted downward, and a deployed position in which the arm assembly is pivoted rearward.

In yet another implementation of the invention, a vehicle bicycle rack for attaching to a vehicle and carrying at least one bicycle thereon includes a support, attachable to the vehicle, and an arm assembly. The support includes a front-to-back, horizontal member having a front end attachable to a vehicle hitch receiver, a vertical member extending upward from the horizontal member, and a sleeve extending from the vertical member in a left-to-right, transverse direction. The vertical member is telescopically height-adjustable for varying the height of the sleeve relative to the vehicle. In turn, the arm assembly includes a cross member pivotably mounted on the support by rotatably extending through the sleeve of the support. The arm assembly further includes two arms carried by and extending from the cross member at opposite ends thereof and configured to hold the at least one bicycle. The arm assembly can pivotably adopt a stowed position in which the arm assembly is pivoted downward and the arms extend downward, and a deployed position in which the arm assembly is pivoted rearward and the arms extend rearward.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a vehicle bicycle rack configured to be mounted on a motorized vehicle such as an automobile. The vehicle bicycle rack can securely hold one or more bicycles so that the bicycles can be transported on the motorized vehicle. The term "bicycle," as used herein, is intended to refer to conventional two-wheeled bicycles, and to like vehicles such as tricycles.

Figure 1:
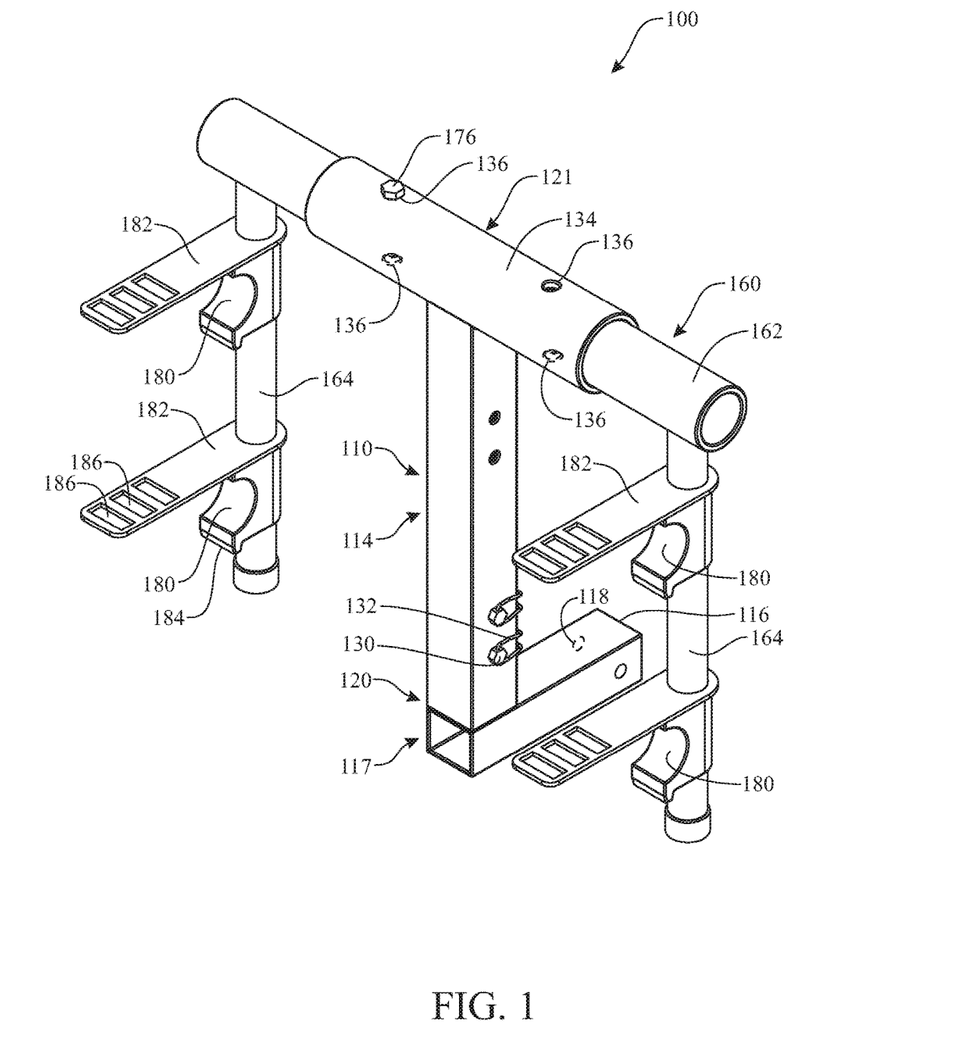
FIG. 1 presents a top front perspective view of a vehicle bicycle rack in accordance with a first embodiment of the present invention, the vehicle bicycle rack shown assembled and in a lowered state.
Figure 2:
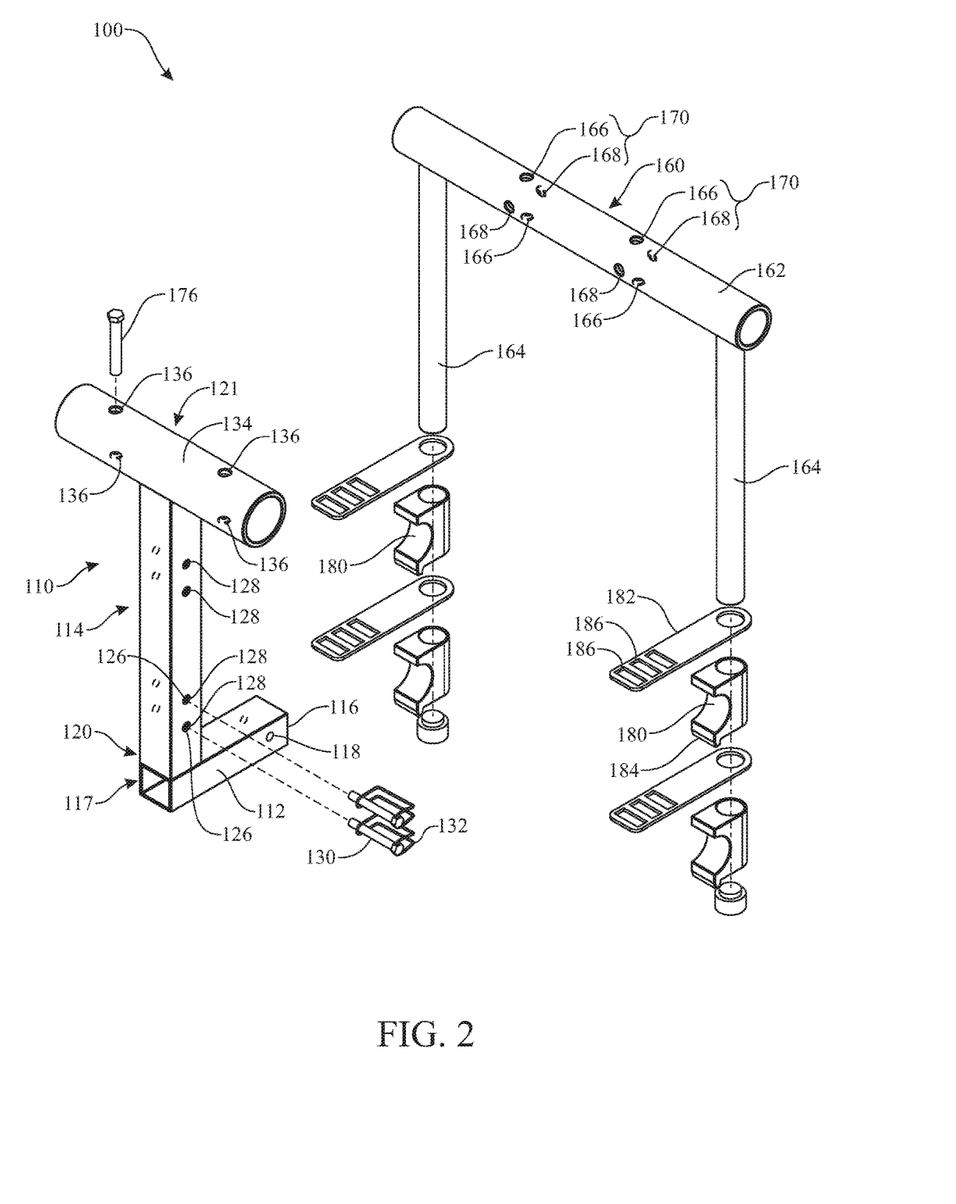
FIG. 2 shows a top front perspective view of the vehicle bicycle rack of FIG. 1, shown exploded.
Figure 7:
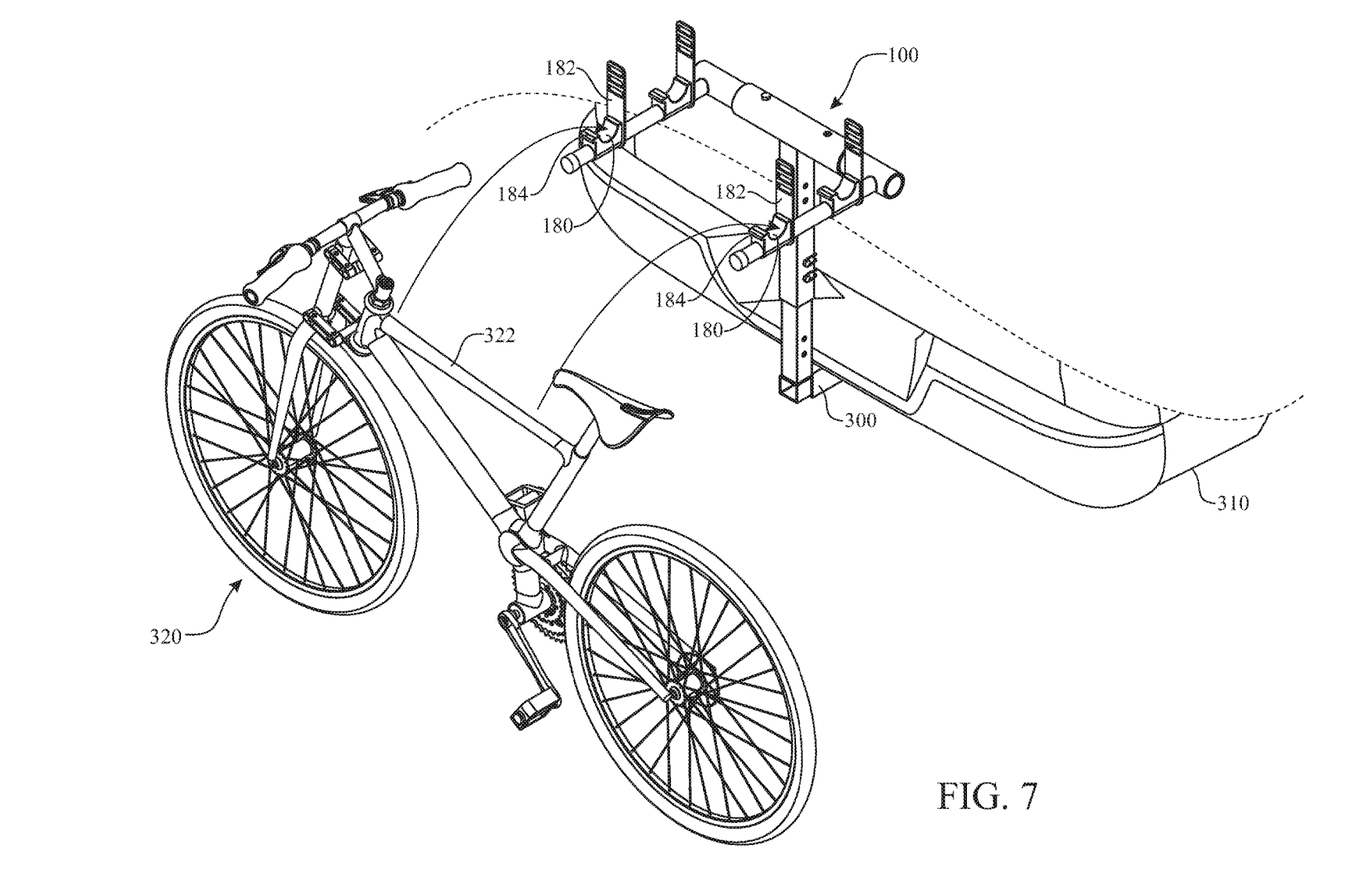
FIG. 7 shows a top front perspective view of the vehicle bicycle rack and vehicle of FIG. 6, the vehicle bicycle rack shown coupled to a vehicle and about to receive a bicycle thereon.
Figure 8:
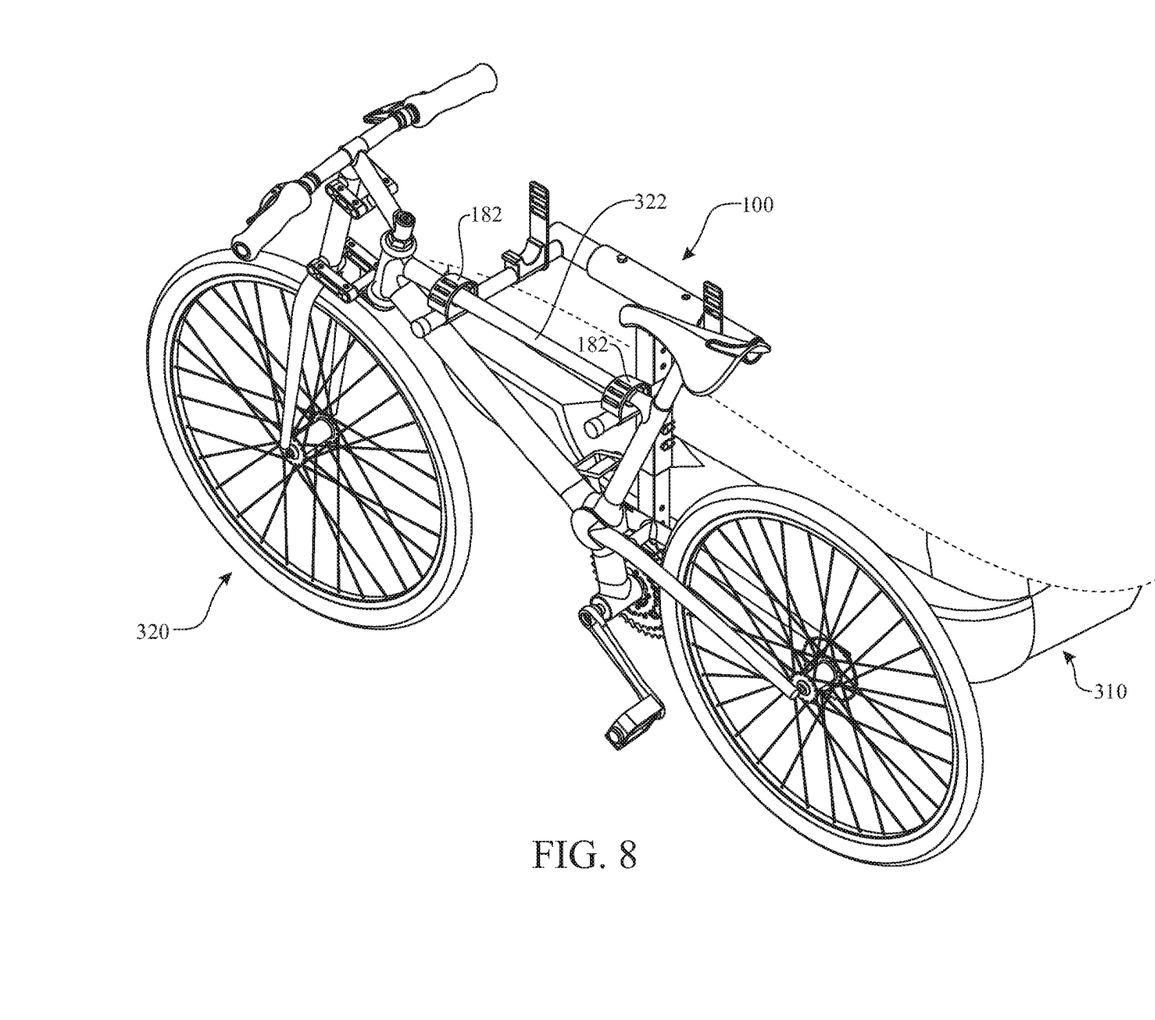
FIG. 8 shows a top front perspective view of the vehicle, vehicle bicycle rack and bicycle of FIG. 7, the bicycle shown mounted on the vehicle bicycle rack.
Figure 9:
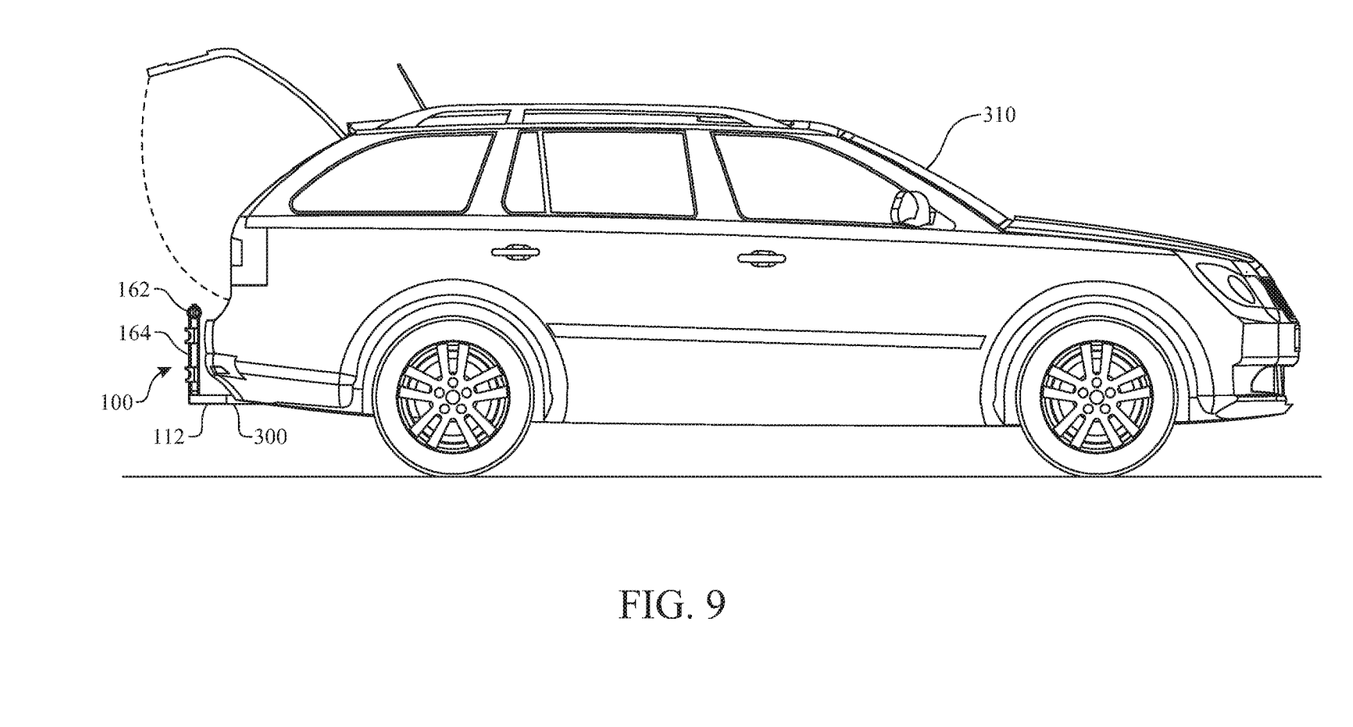
FIG. 9 shows a side elevation view of a vehicle carrying the vehicle bicycle rack of FIG. 1, the vehicle bicycle rack not interfering with the closing trunk door.

Referring initially to FIGS. 1 and 2, a vehicle bicycle rack 100 is shown in accordance with an illustrative embodiment of the invention. The vehicle bicycle rack 100 comprises a support 110 and an arm assembly 160. The support 110 is configured to engage a mounting provision, such as a hitch receiver 300 on a motorized vehicle 310, as best shown in FIGS. 7 and 9. The hitch receiver 300 can be, for example, a 1.25-inch by 1.25-inch class I, II or III hitch receiver. This particular type of mounting provision is disclosed for exemplary purposes only; in alternative embodiments, the support 110 can be configured to mate with other types of mounting provisions, such as provisions for mounting the vehicle bicycle rack 100 on the bumper of the motorized vehicle. In turn, the arm assembly 160 is configured to rotationally engage the support 110, for purposes that will be explained in greater detail hereinafter. The support 110 is height adjustable, to allow elevating or descending the arm assembly 160 as will be explained in greater detail hereinafter.

The support 110 can include a first, horizontal member 112, and a second, vertical member 114. The horizontal member 112 and the vertical member 114 are formed from a rigid material such as steel or aluminum. The horizontal member 112 is tubular, i.e., the horizontal member 112 is an elongated structure with a hollow interior. For instance and without limitation, the horizontal member 112 can have a substantially square cross section, and includes a front end 116 sized to telescopically engage the hitch receiver 300 of the vehicle 310. The front end 116 can include any suitable means for securing to the hitch receiver 300 of the vehicle 310. For instance and without limitation, the horizontal member 112 can have a pair of diametrically-opposed holes 118 formed therein, configured to align with a corresponding pair of holes (not shown) in the hitch receiver 300, when a first end of the horizontal member 112 has been inserted into the hitch receiver 300 by a predetermined distance. The aligned holes receive a pin (not shown) which secures the horizontal member 112 to the hitch receiver 300.

A lower end 120 of the vertical member 114 is securely attached to a rear end 117 of the horizontal member 112 by a suitable means such as welding. However, alternative embodiments are contemplated, such as having the lower end 120 of the vertical member 114 integrally formed and with the horizontal member 112. The vertical member 114 of the present embodiment comprises a bottom portion 122 and a top portion 124, both of which are tubular and have a substantially square cross section, similarly to the horizontal member 112. The bottom portion 122 and top portion 124 are telescopically engaged, such as by having the top portion 124 fit onto the bottom portion 122 and slide thereon allowing the vertical member 114 to compress or expand for purposes that will be hereinafter explained. The outer dimensions of the bottom portion 122 and the inner dimensions of the top portion 124 are selected so that the bottom portion 122 fits within the top portion 124 with minimal or no clearance to help minimize bouncing rattle and vibration caused by relative movement between the bottom portion 122 and the top portion 124.

Figure 3:
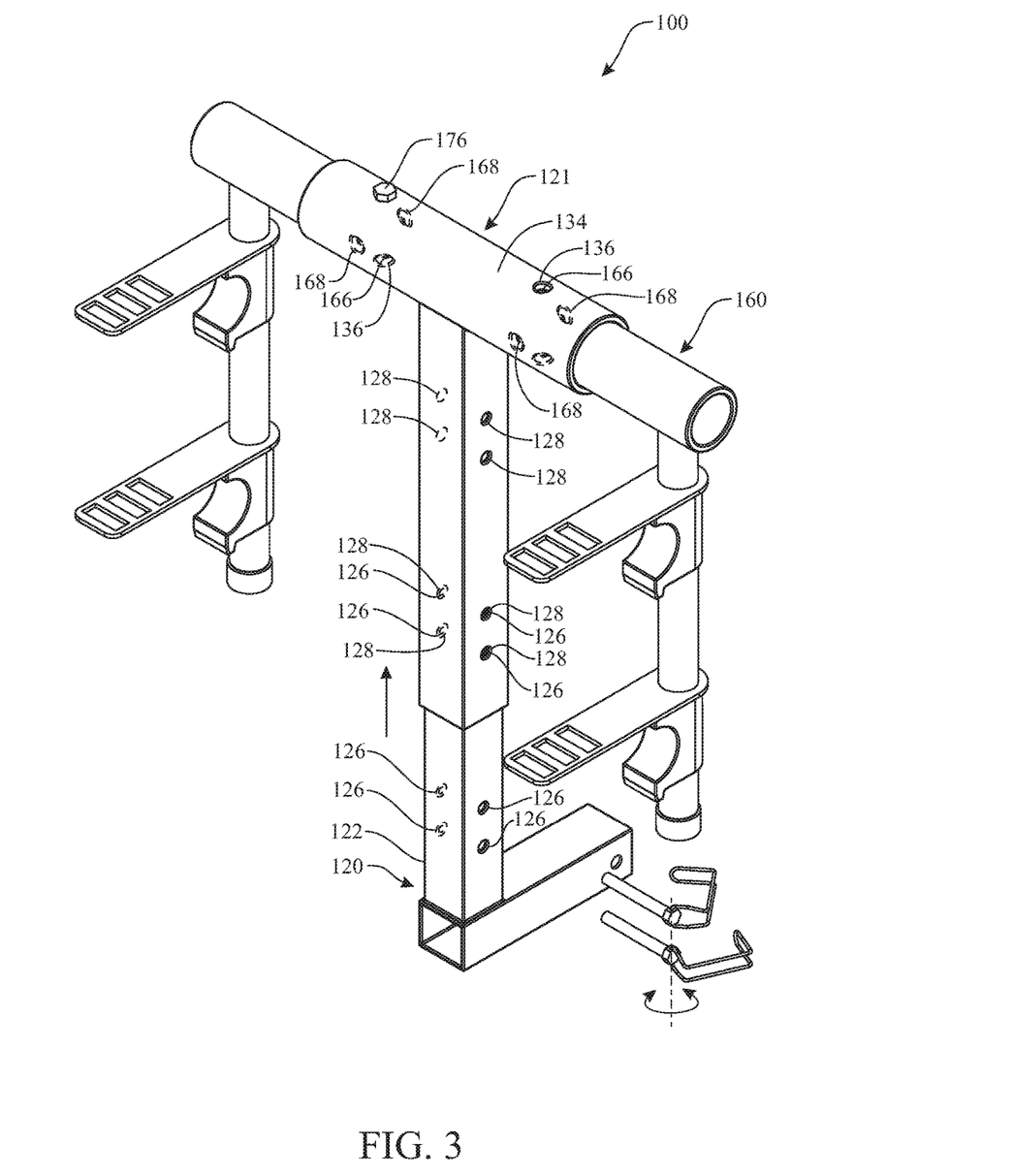
FIG. 3 shows a top front perspective view of the vehicle bicycle rack of FIG. 1, the vehicle bicycle rack shown assembled and in an elevated position.

The vertical member 114 is selectively adjustable to different lengths. For instance and without limitation, the bottom portion 122 of the vertical member 114 can have one or more pairs of diametrically-opposed holes 126 formed therein, as shown in FIG. 3. The pairs are formed at different heights, defining different locking positions of the vertical member 114. Similarly, the top portion 124 of the vertical member 114 can have one or more pairs of diametrically-opposed holes 128 arranged at different heights and configured to align with one pairs of diametrically-opposed holes 126 of the bottom portion 122 of the vertical member 114.

Figure 5:
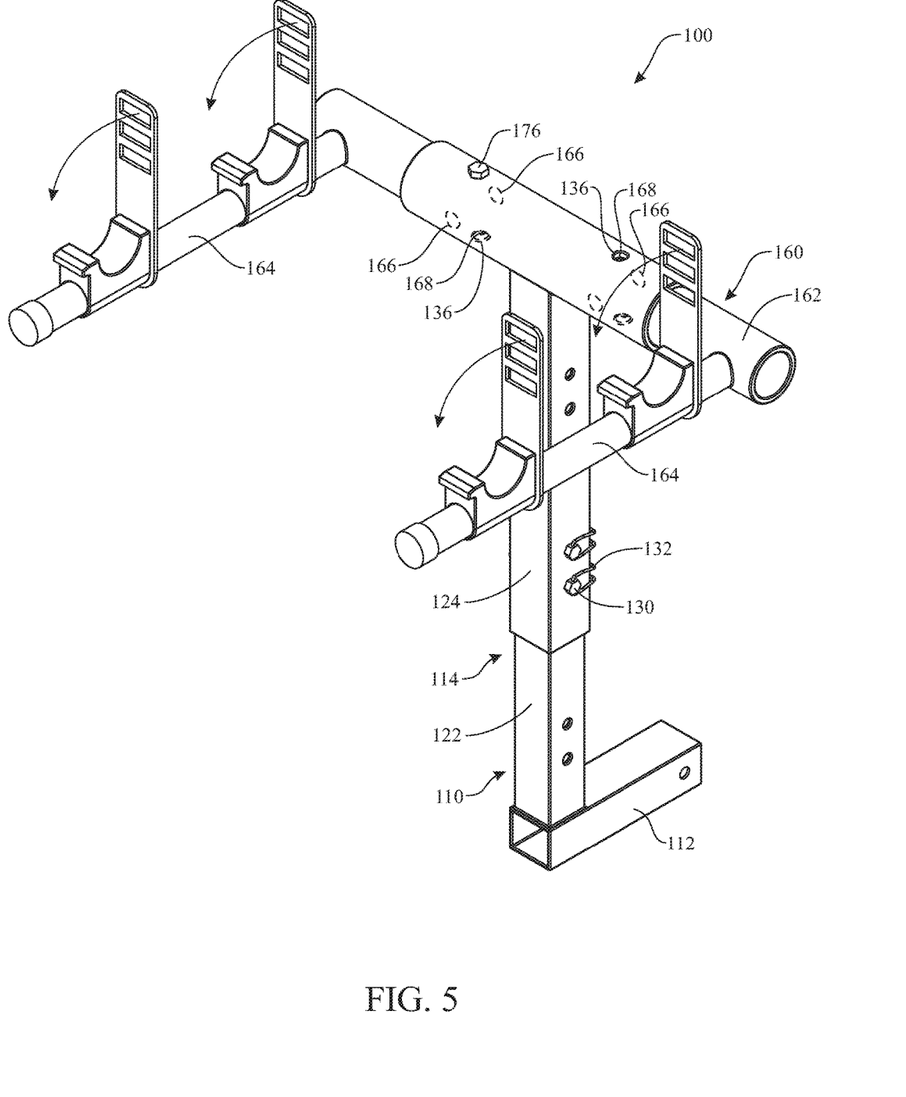
FIG. 5 shows a top front perspective view of the vehicle bicycle rack of FIG. 1, the vehicle bicycle rack shown elevated and fully pivoted upward.

For example, as best shown in FIG. 3, the bottom portion 122 of the present embodiment includes four pairs of diametrically-opposed holes 126. Two pairs of holes 126 are formed proximate a lower end of the vertical member 114. The other two pairs of holes 126 are formed proximate an upper end of the vertical member 114, or at a higher position as compared to the lower holes 126. In turn, the vertical top portion 124 of the present embodiment has two pairs of diametrically-opposed holes 128 formed proximate a lower end thereof, and two other pairs of holes 128 formed proximate an upper end thereof. As shown in FIG. 3, the bottom portion 122 and the top portion 124 are configured so that the lowermost two pairs of diametrically-opposed holes 126 in the bottom portion 122 each align with a corresponding pair of the diametrically-opposed holes 128 in the top portion 124 when the arm assembly 160 is in a lower position, shown for instance in FIG. 2. The bottom portion 122 and top portion 124 are also configured so that the highest two pairs of diametrically-opposed holes 126 in the bottom portion 122 each align with the same corresponding pair of the diametrically-opposed holes 128 in the top portion 124 when the arm assembly 160 is in a higher position, shown for instance in FIG. 2. As shown for instance in FIGS. 1 and 5, one or two pins 130 are inserted in the aligned holes 126, 128 to maintain the arm assembly 160 in the lower position (FIG. 1) or in the higher position (FIG. 5). Each pin 130 can be equipped with a strap or bracket 132 configured to engage both ends of the pin 130, as shown in FIG. 2, to prevent the pin 130 from backing out of the holes 126, 128. The vertical member 114 thus can be moved between its compressed position (FIG. 1) and extended position (FIG. 5) and secured to either position with minimal effort and without a need for any disassembly of the vehicle bicycle rack 100.

It should be noted that the vertical member 114 is described as having four pairs of transversely-opposed holes 126 for exemplary purposes only. The vertical member 114 of alternative embodiments can be equipped with more or less than four pairs of holes 126, and the holes 126 can be located at positions other than those described herein to permit the arm assembly 160 to be secured in vertical positions other than or in addition to those described herein.

The support 110 further comprises a left-to-right, transverse sleeve 134, which is non-movably attached to the top portion 124 of the vertical member 114 in a T-shaped configuration by a suitable means such as welding. The sleeve 134 is tubular, and has a generally circular cross section. The sleeve 134 has two pairs of diametrically-opposed holes 136 formed therein as best shown in FIG. 2. The purpose of the holes 136 is hereinafter described in greater detail. The sleeve 134 can be formed from a rigid material such as steel or aluminum.

The arm assembly 160, in turn, includes a cross member 162 and two arms 164 as shown in FIGS. 1 and 2. In the present embodiment, each of the cross member 162 and the arms 164 is tubular and has a substantially circular cross section. The cross member 162 and the arms 164 can be formed as solid cylinders in alternative embodiments. The cross member 162 and the arms 164 are formed from a rigid material such as steel or aluminum.

As best shown in FIG. 2, the cross member 162 can have four pairs of diametrically-opposed holes 166, 168 formed therein. Two of the pairs of holes 166, 168 are located at approximately the same position along the length of the cross member 162 forming a first group 170; within said first group 170, one pair of holes 166 is angularly offset from the other pair of holes 168, such as by 90 degrees. The remaining two pairs of holes 166, 168 are located at another position along the length of the cross member 162 forming a second group 172; within said second group 172, one pair of holes 166 is angularly offset from the other pair of holes 168 the same angle as that of the first group 170 (e.g., 90 degrees).

Figure 4:
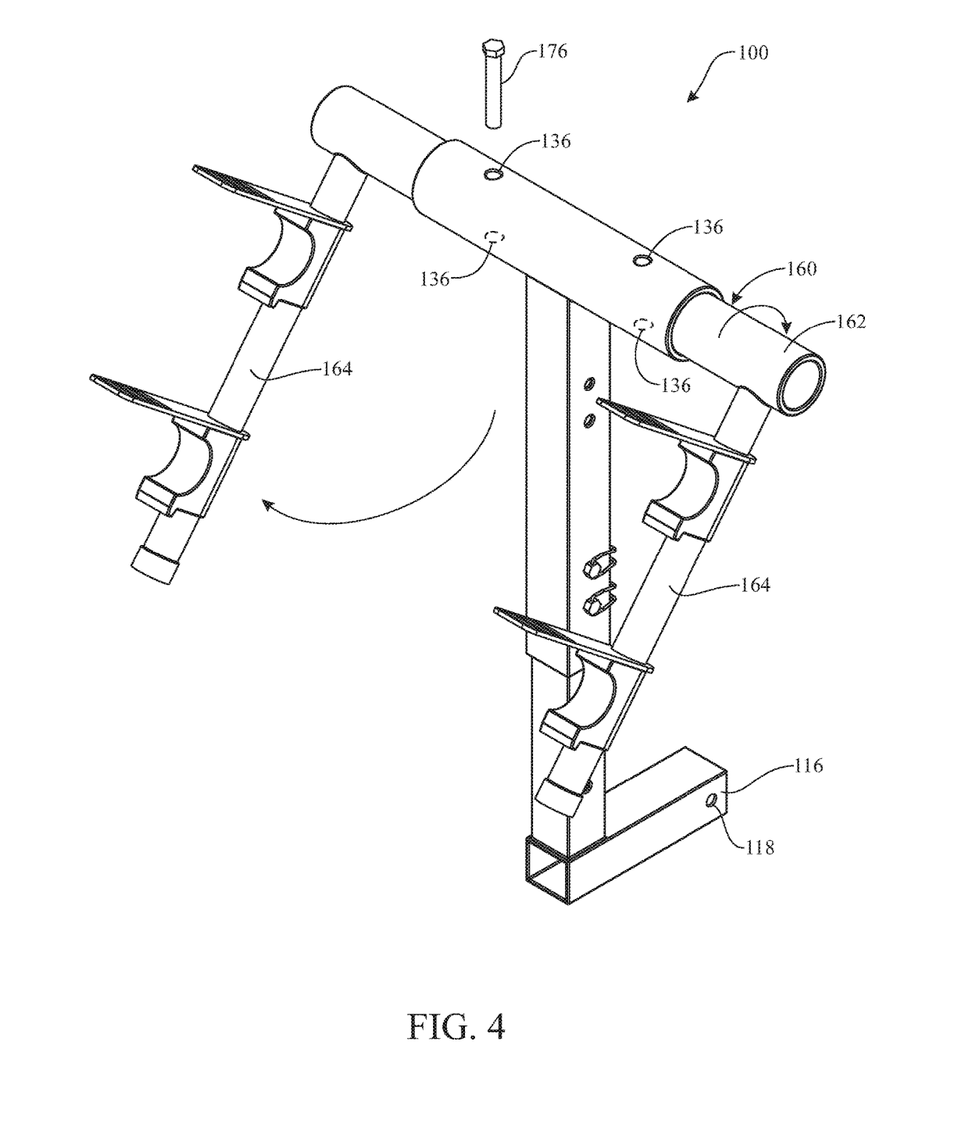
FIG. 4 shows a top front perspective view of the vehicle bicycle rack of FIG. 1, the vehicle bicycle rack shown elevated and partially pivoted upward.

As mentioned heretofore, the arm assembly 160 is rotationally coupled to the support 110. More specifically, the cylindrical cross member 162 of the arm assembly 160 is rotationally fitted into the cylindrical sleeve 134 of the support 110. The arm assembly 160 can be rotationally adjusted to a stowed or lowered position, shown for instance in FIG. 3, to a usage or deployed position, shown in FIG. 5, by following the lifting sequence shown in FIGS. 3-5. This feature permits the vehicle bicycle rack 100 to assume a relatively compact configuration when not in use, as in the stowed position of FIG. 3, the arms 164 of the arm assembly 160 are arranged on the sides of the vertical member 114 of the support 110.

The cross member 162 of the arm assembly 160 and the sleeve 134 of the support 110 are configured so that two of the pairs of holes 168 in the cross member 162 each align with a corresponding pair of diametrically-opposed holes 136 in the sleeve 134, when the arm assembly 160 is in its deployed position (FIG. 5). One or two pins 176 (a single pin 176 being shown in the drawings) are inserted in the aligned holes 168, 136, to maintain the arm assembly 160 in the deployed position of FIG. 5. Though not shown, each pin 176 can be equipped with a strap or bracket configured to engage both ends of the pin 176 to prevent the pin 130 from backing out of the holes 168, 136, similarly to the strap or bracket 132 of the pins 130 described heretofore.

Similarly, each of the other two sets of diametrically-opposed holes 166 in the cross member 162 of the arm assembly 160 aligns with the pair of holes 136 in the sleeve 134 when the arm assembly 160 is, instead, rotated 90 degrees downward to its stowed position (FIG. 3). The pins 176 can be inserted into the aligned holes 166, 136, to maintain the arm assembly 160 in the stowed position of FIG. 3. The arm assembly 160 thus can be moved from its stowed position to its deployed position, and vice versa, with minimal effort and without a need for any disassembly of the vehicle bicycle rack 100.

It should be noted that the cross member 162 of the arm assembly 160 is described as having four pairs of diametrically-opposed holes 166, 168 for exemplary purposes only. The cross member 162 of alternative embodiments can be equipped with more, or less than four pairs of holes 166, 168, and the holes 166, 168 can be located at positions other than those described herein, to permit the arm assembly 160 to be secured in angular positions other than, or in addition to the deployed and stowed positions shown herein.

To facilitate securing at least one bicycle to the vehicle bicycle rack 100, at least one bicycle receiving section 180 is positioned over each arm 164. For instance, the vehicle bicycle rack 100 of the present embodiment is provided with two bicycle receiving sections 180 on each arm 164, at matching lengths of the arms 164; this particular configuration accommodates two bicycles or like vehicles oriented substantially parallel to the lengthwise direction of the cross member 162. This configuration is disclosed for exemplary purposes only; the length of the arms 164 and the number of bicycle receiving sections 180 can be varied in alternative embodiments so that the arm assembly 160 can accommodate less, or more than two bicycles or similar vehicles. The bicycle receiving sections 180 can be held in place on the respective arms 164 by way of a friction or interference fit, or by an adhesive, welding or other fastener. Each bicycle receiving section 180 is configured to receive (serve as a seating region for) the upper portion of the frame of the corresponding bicycle. In some embodiments, the bicycle receiving sections 180 can exert a clipping or clamping effect on the bicycle frame. Each bicycle is thus suspended from, and secured to the arm assembly 160 by way of the bicycle receiving sections 180.

Resilient bands 182 are positioned on each arm 164. Each band 182 can be wrapped around the corresponding bicycle frame, stretched, and secured using features such as a tongue 184 that engages one of a plurality of penetrations 186 formed in the band 182, to further secure the bicycle to the arm assembly 160. The use of the bicycle receiving sections 180 and the bands 182 as the interface between the arm assembly 160 and the bicycles is disclosed for exemplary purposes only. Other means for securing the bicycles to the arm assembly 160, such as clamps, latches, etc., can be used in the alternative.

Figure 6:
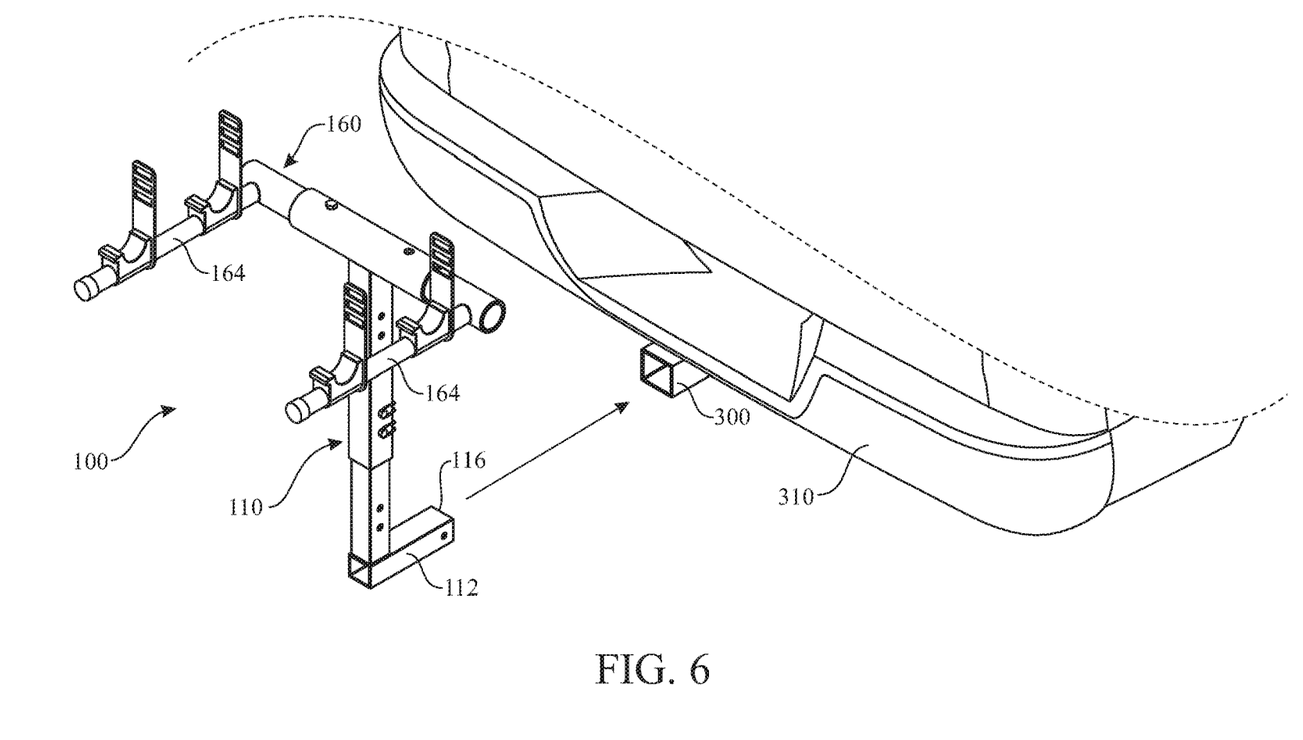
FIG. 6 shows a top front perspective view of the vehicle bicycle rack of FIG. 1 in the position of FIG. 5, being coupled to a hitch receiver of a vehicle.

Operation of the vehicle bicycle rack 110 is further depicted in FIGS. 6-9. As shown in FIG. 6, the vehicle bicycle rack 100 can be attached to a vehicle 310 by coupling the front end 116 of the horizontal member 112 of the support 110 to the hitch receiver 300 of the vehicle 310. Next, a bicycle 320 is attached to the vehicle bicycle rack 110 by placing a top bar 322 of the bicycle frame in two transversely-opposed bicycle receiving sections 180 of the respective opposite arms 164 as indicated in FIG. 7. The user can then secure the corresponding bands 182 to the corresponding tongues 184 to retain the top bar 322 within the bicycle receiving sections 180 and prevent the bicycle 310 from falling from the vehicle bicycle rack 110. In this final, assembled position shown in FIG. 8, the bicycle 320 can be safely transported by the vehicle 310.

As mentioned heretofore, the vehicle bicycle rack 100 of the present invention provides a pivotable bicycle-carrying arm assembly 160, and further provides for vertical adjustability of the arm assembly 160 by having the arm assembly 160 pivotably carried by a height-adjustable support 110. Having a pivotable arm assembly 160 allows that the vertical position of the arm assembly 160 to be varied between a lower position shown in FIGS. 1, 3 and 9, and an upper position shown in FIGS. 5-8. This feature can allow an appropriate or otherwise desired clearance to be maintained between the bicycle and the ground regardless of the overall height of the bicycle. The ability to adjust the vertical position of the arm assembly 160 also allows the arm assembly 160 to be lowered sufficiently to provide clearance between the arm assembly 160 and the rear door, or hatch, of a hatchback vehicle as the hatch is opened and closed, as shown in FIG. 9. This feature thereby can allow the vehicle bicycle rack 100 to remain on the hatchback vehicle when the rack is not in use, without interfering with the ability of the user to open and close the hatch.

The height of the arm assembly 160 above the ground can be varied with minimal effort, and without a need for any disassembly of the vehicle bicycle rack 100. This feature can be used to adjust the ground clearance of the bicycle being carried by the rack, and can allow the vehicle bicycle rack 100 to assume a more compact configuration when not in use. As discussed above, the ability of the vehicle bicycle rack 100 to assume a compact vertical profile can allow a user to open and close the hatch 312 of a hatchback vehicle while the vehicle bicycle rack 100 is installed on the vehicle, as shown in FIG. 9, thereby allowing the vehicle bicycle rack 110 to remain on the vehicle 310 during periods of non-use without interfering with the operation of the hatch 312.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A vehicle bicycle rack for attaching to a vehicle and carrying at least one bicycle thereon, comprising:
   a support, attachable to the vehicle, the support comprising a sleeve arranged in a left-to-right, transverse direction; and
   an arm assembly comprising a first portion pivotably mounted on the support, and a second portion extending from the first portion and configured to hold the at least one bicycle, wherein the first portion comprises a cross member rotatably extending through the sleeve of the support and the second portion comprises at least one arm carried by and extending from the cross member, wherein
   the support is height adjustable for varying the height of the arm assembly relative to the vehicle; and
   the arm assembly can pivotably adopt:
      a stowed position in which the arm assembly is pivoted downward, and
      a deployed position in which the arm assembly is pivoted rearward.

2. The vehicle bicycle rack of claim 1, wherein the at least one arm is configured to hold the bicycle.

3. The vehicle bicycle rack of claim 2, wherein the arm assembly further comprises one or more bicycle receiving sections carried by the at least one arm and configured to mate with the bicycle.

4. The vehicle bicycle rack of claim 3, wherein the arm assembly further comprises at least one band configured to secure the bicycle to the at least one arm.

5. The vehicle bicycle rack of claim 4, wherein each band of the at least one band extends from an end of a respective bicycle receiving section of the one or more bicycle receiving sections and couples with an opposite end of the respective bicycle receiving section to secure the bicycle to the respective bicycle receiving section.

6. The vehicle bicycle rack of claim 1, wherein the at least one arm comprises two arms, wherein one arm is mounted at or proximate a first end of the cross member and the other arm is mounted at or proximate an opposite second end of the cross member.

7. The vehicle bicycle rack of claim 1, wherein the sleeve is attached to a top end of the second member.

8. The vehicle bicycle rack of claim 1, wherein the arm assembly is configured to be secured in a first vertical position corresponding to a first height of the telescopic, height-adjustable second member, and a second vertical position corresponding to a second height of the telescopic, height-adjustable second member.

9. The vehicle bicycle rack of claim 8, wherein:
   the second member of the support comprises a bottom portion, and a top portion telescopically connected to the bottom portion; wherein one of the top and bottom portions of the support has a first and a second pair of transversely-opposed holes formed therein;

the other of the top and bottom portions of the support has a pair of transversely-opposed holes formed therein;

the top and bottom portions of the support are configured so that the first set of transversely-opposed holes in the one of the top and bottom portions of the support aligns with the pair of transversely-opposed holes in the other of the top and bottom portions of the support and receive a pin when the arm assembly is in the first vertical position; and the top and bottom portions of the support are further configured so that the second set of transversely-opposed holes in the one of the top and bottom portions of the support aligns with the pair of transversely-opposed holes in the other of the top and bottom portions of the support and receive the pin when the arm assembly is in the second vertical position.

10. The vehicle bicycle rack of claim 1, wherein the first member of the support is a front-to-back, horizontal bar.

11. The vehicle bicycle rack of claim 1, wherein the mounting provision is a hitch receiver.

12. A vehicle bicycle rack for attaching to a vehicle and carrying at least one bicycle thereon, comprising:
- a support, attachable to the vehicle, the support comprising a sleeve arranged in a left-to-right, transverse direction; and
- an arm assembly comprising a cross member pivotably mounted on the support by rotatably extending through the sleeve of the support, and at least one arm carried by and extending from the cross member and configured to hold the at least one bicycle, the at least one arm comprising two arms, wherein one arm is mounted at or proximate a first end of the cross member and the other arm is mounted at or proximate an opposite second end of the cross member, wherein
- the support is telescopically height-adjustable for varying the height of the sleeve and cross member relative to the vehicle; and
- the arm assembly can pivotably adopt:
  - a stowed position in which the arm assembly is pivoted downward, and
  - a deployed position in which the arm assembly is pivoted rearward.

13. A vehicle bicycle rack for attaching to a vehicle and carrying at least one bicycle thereon, comprising:
- a support, attachable to the vehicle, the support comprising a sleeve arranged in a left-to-right, transverse direction, the sleeve having a pair of diametrically-opposed holes formed therein; and
- an arm assembly comprising a first portion pivotably mounted on the support, and a second portion extending from the first portion and configured to hold the at least one bicycle, wherein the first portion comprises a cross member rotatably extending through the sleeve of the support, and the second portion comprises at least one arm carried by and extending from the cross member, and further wherein the cross member of the arm assembly has a first and a second pair of holes formed therein and is configured to be selectively secured in a first angular position and in a second angular position relative to the sleeve of the support, wherein
- the support is height adjustable for varying the height of the arm assembly relative to the vehicle; and
- the arm assembly can pivotably adopt:
  - a stowed position in which the arm assembly is pivoted downward and the cross member of the arm assembly is secured in the first angular position relative to the sleeve of the support, and further in which the pair of diametrically-opposed holes in the sleeve substantially align with the first pair of holes in the cross member and receive a pin, and
  - a deployed position in which the arm assembly is pivoted rearward and the cross member of the arm assembly is secured in the second angular position relative to the sleeve of the support, and further in which the pair of diametrically-opposed holes in the sleeve substantially align with the second pair of holes in the cross member and receive the pin.

14. The vehicle bicycle rack of claim 13, wherein the second angular position is angularly offset from the first angular position by 90 degrees.

15. The vehicle bicycle rack of claim 14, wherein the at least one arm is substantially horizontal when the arm assembly is in the deployed position, and the at least one arm is substantially vertical when the arm assembly is in the stowed position.

* * * * *